United States Patent [19]

Murray et al.

[11] Patent Number: 5,281,288
[45] Date of Patent: Jan. 25, 1994

[54] TAPE FOR AFFIXING A GRIP AND PROCESS FOR USING SAME

[75] Inventors: Thomas J. Murray; F. Rhett Brockington, both of Columbia, S.C.

[73] Assignee: Anchor Continental, Inc., Columbia, S.C.

[21] Appl. No.: 796,662

[22] Filed: Nov. 25, 1991

[51] Int. Cl.⁵ .................. B29C 63/06; B29C 63/18; C09J 7/02
[52] U.S. Cl. .................. 156/83; 156/187; 156/191; 156/289; 156/294; 156/330; 273/81 R; 428/40; 428/355
[58] Field of Search .................. 156/83, 187, 191, 289, 156/294, 330; 428/355, 354, 351, 40; 273/81 R, 81.5, 67 DB, 75; 525/407

[56] References Cited

U.S. PATENT DOCUMENTS

| | | | |
|---|---|---|---|
| 3,096,202 | 7/1963 | Groot | 428/355 |
| 3,281,491 | 10/1966 | Smith | 525/524 |
| 3,462,393 | 8/1969 | Legler | 528/107 |
| 3,556,835 | 1/1971 | Sorell | 428/355 |
| 3,606,326 | 9/1971 | Sparks et al. | 273/81 R |
| 3,639,500 | 2/1972 | Muny et al. | 156/330 |
| 3,765,972 | 10/1973 | Wesp | 156/330 |
| 3,843,397 | 10/1974 | Olson | 428/355 |
| 3,865,770 | 2/1975 | Blake | 156/338 |
| 4,404,243 | 9/1983 | Terpay | 428/355 |
| 4,548,845 | 10/1985 | Parsons et al. | 428/355 |
| 4,569,960 | 2/1986 | Blake | 428/355 |
| 4,689,131 | 8/1987 | Roue et al. | 204/181.7 |
| 4,940,852 | 7/1990 | Chernack | 528/146 |

FOREIGN PATENT DOCUMENTS 7893 5/1992 PCT Int'l Appl. .................. 156/330

OTHER PUBLICATIONS

Flier on Polyox (no date).

*Primary Examiner*—Michael W. Ball
*Assistant Examiner*—Steven D. Maki
*Attorney, Agent, or Firm*—F. Rhett Brockington

[57] ABSTRACT

A double sided tape comprised of a carrier which is coated with a first pressure sensitive adhesive which is a water swellable adhesive that contains a lubricity component that temporarily, so long as water is present, imparts a high degree of slip to the nominally tacky surface of the adhesive when the adhesive is wetted with water, wherein the lubricity component is a high molecular weight polyoxyethylene resin, and where said carrier is coated on its opposing side with a second pressure sensitive adhesive, which is substantially a rubber based adhesive having good shear properties, wherein the double sided tape is wound in roll form with an interleaving double sided release liner which is laminated to the first pressure sensitive adhesive.

7 Claims, 2 Drawing Sheets

5,281,288

TAPE FOR AFFIXING A GRIP AND PROCESS FOR USING SAME

BACKGROUND OF THE INVENTION

The invention relates generally to pressure sensitive adhesive tapes; and more particularly to pressure sensitive adhesive tapes used as a fastening means for securing a grip to a shaft or handle.

In general, pressure sensitive adhesive tapes are used as a facile fastening means, relying on the nominally tacky surface of the adhesive to effect a bond between two or more substrates. For instance, double sided tapes are used as a fastening means to adhere a golf club grip to the shaft of a golf club. The grip is affixed on the shaft by first wrapping the shaft with a strip of double sided tape, wherein one side of the double sided tape is adhered to the shaft and the other side of the tape has the adhesive exposed such that it can adhere to the interior wall of the tubular shaped grip. Typically, a grip is composed of a flexible rubber-like material which will yield, causing it to deform, when stressed under the force of fitting the grip on the shaft. Therefore, before the grip can be slid onto the shaft, the exposed adhesive has to be rendered temporarily tack free, to a point where it is actually slippery. Conventional pressure sensitive adhesives, containing natural rubber, can be rendered temporarily slippery by coating them with an organic solvent, such as lighter fluid or lacquer thinner, just prior to putting on the grip. The organic solvent partially solvates the surface of the adhesive, which makes it slippery. The gripping process is further facilitated by applying the organic solvent to the interior wall of the grip. While wetted with the solvent, the grip is pushed onto the shaft. As the solvent dries off, the adhesive looses its slippery character, gradually regaining its pressure sensitive character, producing adherence of the grip to the shaft through the tape.

Organic solvents are generally perceived by the public as being toxic to the environment, and many solvents are considered hazardous to the user as a source of fire, and are frequently identified as being a health risks. An improved gripping process would be one in which the exposed adhesive of the double sided pressure sensitive tape did not require being wetted with an organic solvent prior to sliding on the grip. For instance, if the adhesive could be rendered temporarily slippery through the application of water, this would eliminate the need for an organic solvent. Like the double sided tape with the conventional adhesive, the adhesive must regain its pressure sensitivity after the grip is in position, therein producing adherence of the grip to the shaft through the tape. The instant invention is a pressure sensitive adhesive tape having an adhesive that is imbued with this anisothropic response to water, paradoxically exhibiting both tack and slip, responding functionally to the concentration of water.

SUMMARY OF THE INVENTION

The instant invention is a tape for securing a hand grip to a shaft or a handle, wherein the instant grip tape is a fastening means for securing a grip to a shaft. In contradistinction to tapes heretofore used to secure grips, the instant invention is "activated" when wetted with water instead of an organic solvent, wherein "activated" refers to the process whereby the nominally tacky adhesive is rendered temporarily slippery.

Said grip tape is substantially a double sided tape comprised of a carrier, where the carrier is an elongate ribbon-like supporting web, onto which is coated a first pressure sensitive adhesive which will go against the interior wall of the grip, and onto which, on the opposing side of the carrier, is coated a second pressure sensitive adhesive which will go against the shaft. In roll form, the first and second pressure sensitive adhesive are separated with at least one release liner. The first pressure sensitive adhesive will hereafter be referred to as the grip adhesive, and the second pressure sensitive adhesive as the shaft adhesive. The grip adhesive exhibits a significant affinity for water and would be considered at least moderately hydrophilic. The shaft adhesive, on the other hand, can possess varying lesser degrees of hydrophilicity as it will not be activated, and will not come in direct contact with water, and minimum water sensitivity is generally preferred. Both the grip and the shaft adhesive have good shear properties.

The grip adhesive, when wetted with water, swells, and generally is partially water soluble or water dispersible, yet is relatively non-hygroscopic, being relatively insensitive to changes in the relative humidity. Additionally, the grip adhesive readily dries after being wetted, therein enabling it to regain its pressure sensitive adhesive properties after the grip has been positioned on the shaft. It has been observed that a pressure sensitive grip adhesive, having the enumerated properties of good shear, swelling in water, yet being relatively non-hygroscopic, does not break down enough in water to impart a level of slip comparable to a rubber based conventional adhesive activated with an organic solvent, and so its formulation must contain an additional component that enhances slip when the adhesive is activated. The grip adhesive is formulated to include a lubricity component, which is water soluble and imparts a high degree of slip to water at very low concentration levels. The lubricity component is compatible with the adhesive, it is not particularly hygroscopic, and does not significantly alter the properties of the adhesive. In general, water soluble polymers having molecular weights in excess of 900,000 impart some lubricity to water. In particular, Union Carbide's Polyox water soluble resins, which are polyoxyethylenes, and especially the WSR series, have been found to impart the desired lubricity to the wetted adhesive at very low concentration levels. WSR-301 has the optimum balance of properties. WSR-301 has a reported molecular weight of 4,000,000. The WSR series is thixotropic and highly viscoelastic, and spans a molecular weight range of 0.9 million to over 7 million.

Most applications of grip tape are anticipated to be attendant with long term exposure to high humidity, such as would be the case with a golf club grip, or a grip on a tool such as a hammer, or a grip on a handle bar of a bicycle. The pressure sensitive adhesives on both the grip side and the shaft side of the carrier must be substantially unaffected by atmospheric moisture. Water soluble adhesives that derive their solubility from alkali metal salts of carboxylic acids have been found in general to have an unacceptably high hygroscopicity. Adhesives containing water soluble ethers, such as methyl vinyl ether or polyethylene oxide, are generally adequately hydrophilic without being unduly hydroscopic.

In addition to the lubricity component the grip adhesive contains the appropriate antioxidants and biocides to prevent deterioration of the adhesive.

The carrier has sufficient dimensional stability and strength to translate the torque, generated when the grip is twisted, to the shaft; and vice versa. Strength and dimensional stability are also required to withstand the shearing action generated during the gripping process. Furthermore, the carrier must be sufficiently flexible to conform to the contours of the shaft. Saturated papers are suitable for many applications.

The shaft adhesive is a pressure sensitive adhesive having good shear and aging properties.

DETAILED DESCRIPTION OF THE ILLUSTRATED EMBODIMENT

Figure 1:
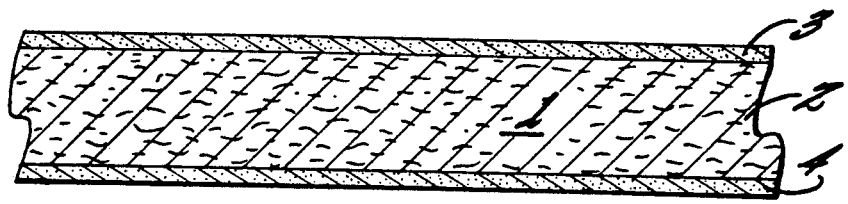
FIG. 1 is a cross-sectional view of the preferred illustrated embodiment.
Figure 2:
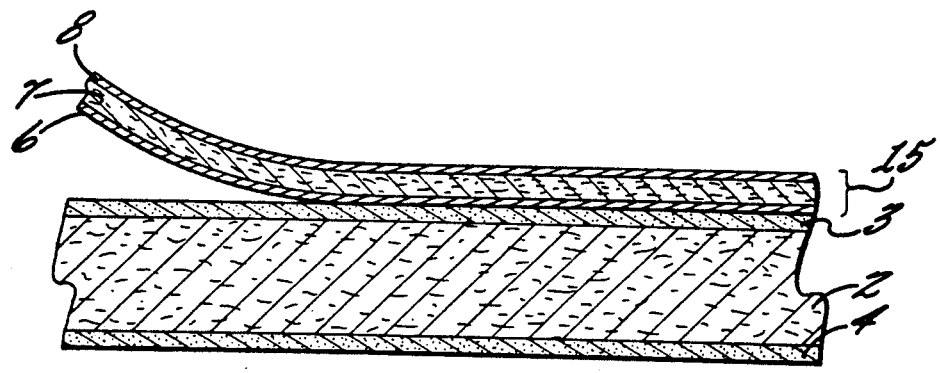
FIG. 2 is a view of the invention shown in FIG. 1 laminated to a double sided release liner.

FIG. 1 is a cross-sectional view of the grip tape 1 designed for fitting golf clubs having chrome plated steel shafts with rubber grips. It is anticipated that the illustrated embodiment would be suitable for a number of other applications. Grip tape 1 is a double sided tape having an overall thickness of 7 mils (0.18 mm) and consisting of a carrier 2, a grip adhesive 3, and a shaft adhesive 4. The carrier 2 is a 32# flatback semi-bleached paper which is impregnated with a polyol based polyurethane elastomer. The carrier, using PSTC-31 test method, has a MD/CD tensile of 25#/22# and a MD/CD elongation of 8%/7%. The carrier is 4.4 mils (0.112 mm) thick. The grip adhesive 3 is a water swellable pressure sensitive adhesive, the base elastomer of which is comprised substantially of a 2000 g. mol. wt. polyoxyethylene diamine cured with a DGEBA epoxy, where DGEBA is an acronym for Diglycidyl Ether Bisphenol A U.S. patent application Ser. No. 7-613844, bearing filing date Nov. 6, 1990, discloses details on the preparation of the epoxy elastomer adhesive composition. Adhesive properties are adjusted through the addition of multifunctional acids and/or isocyanate curing agents. Target properties for the grip adhesive are 180° peel of 65 oz (1.8 Kg) using PSTC-3 test method and shear of greater than one hour using PSTC-7 test method. The adhesive target coating weight is 4.4 g/sq ft (47.4 g/sq meter) which produces an adhesive coating of approximately 1.1 mils (0.028 mm) thick. The adhesive is formulated to include a lubricity component, Polyox WSR-301 at 3% (w/w) phr epoxy elastomer. To distinguish the grip adhesive from the shaft adhesive for the end user a water soluble colorant, Xylene Blue from Sandoz Chemical, is included in the formulation at 0.02% (w/w) phr epoxy elastomer. In addition the adhesive contains a blend of hindered phenol type antioxidants, BHT and Vanox GT, at 3% (w/w) phr epoxy elastomer, and a biocide at <0.1% (w/w) phr epoxy elastomer. The fully formulated grip adhesive is applied as a 35% solids solution in toluene to the carrier 2 using a reverse roll coater. The dried grip adhesive 3 coating is laminated to a white creped double sided silicone release liner 15 shown in FIG. 2. The release liner 15 consists of a double sided white ink barrier coated SBR saturated 28.5# crepe paper 7, which has a first silicone release coating 6, and a second silicone release coating 8. The first silicone coating 6 acts as a release surface against the grip adhesive 3, and the second silicone release coating 8 acts as a release surface against the shaft adhesive 4. The crepe paper release liner has been found to be preferred over a flatback paper, because it is easier to initialize peeling the liner from the double sided tape. The shaft adhesive 4 is based on a roughly equal blend of natural and styrenic block copolymer (SBC) rubbers. The formula is 100 parts rubber, 141 parts resin, 19 parts filler and pigment, 5 parts antioxidant, 0.6 parts cure, and 15.9 parts plasticizer. Additional cure is added at the time it is coated. The 180° Peel PSTC-3 test method target adhesion is 40 oz (1.1 Kg) and the PSTC-7 test method shear target is 6 hours. The dried coating weight target is 4.7 g/sq ft (50.6 g/sq meter) which produces an adhesive coating of approximately 1.5 mils (0.038 mm) thick. The fully formulated shaft adhesive is applied as a 40% solids solution in toluene to the carrier 2 using a reverse roll coater.

In the manufacturing process of making the grip tape, the tape is fabricated in large master rolls, where a master roll is typically 1.5 meters wide, which is then slit down to smaller rolls. For golf club gripping, 1 inch (2.54 cm) and 2 inch (5.08 cm) rolls are generally preferred.

Figure 3:
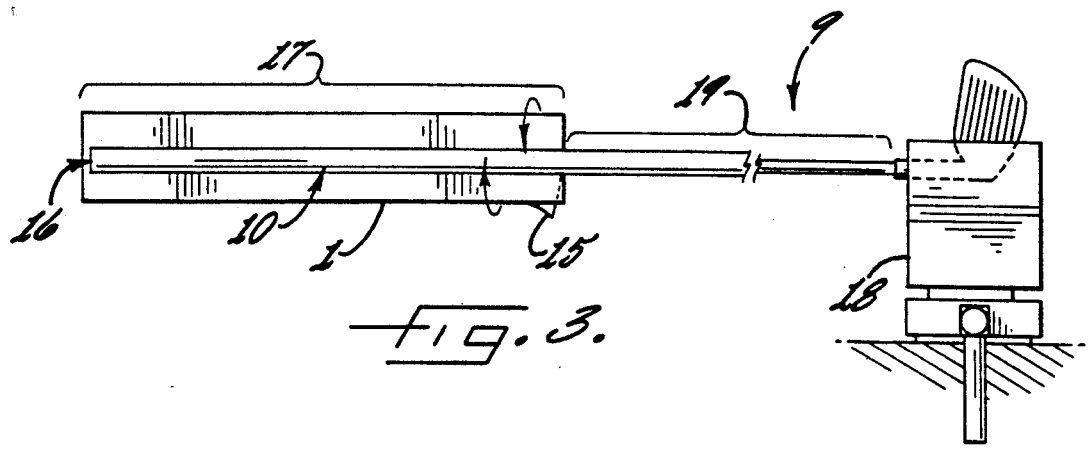
FIG. 3 illustrates the first step in the gripping process wherein the grip tape is being applied to the shaft of a golf club.
Figure 4:
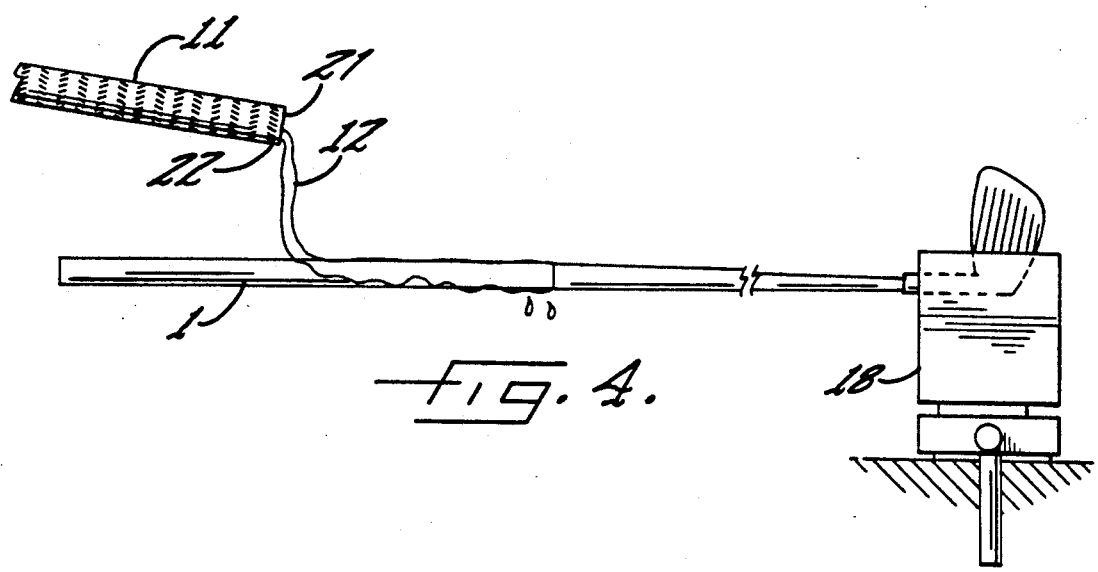
FIG. 4 illustrates the grip tape wherein the exposed adhesive is being activated.
Figure 6:
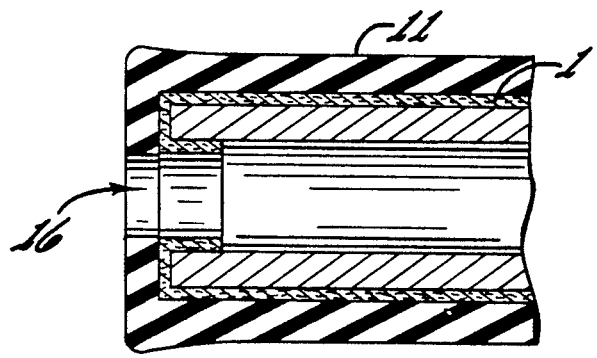
FIG. 6 is a longitudinal cross-sectional view of the terminus of a golf club shaft wrapped with the instant invention, and onto which is mounted a rubber grip.
Figure 5:
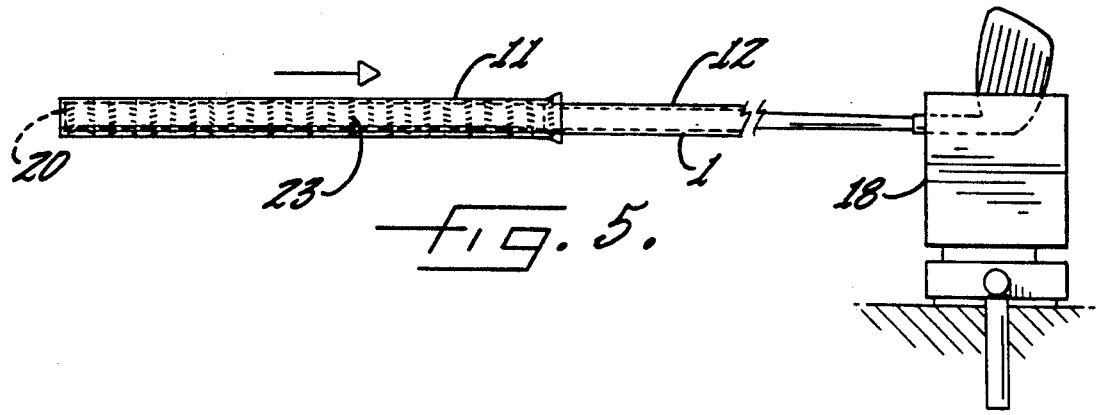
FIG. 5 depicts the last step in the gripping process wherein the grip is forced onto the shaft.

FIG. 3 shows how the grip tape 1 would be employed in a gripping process to effect a fastening means between the shaft 10 of a golf club 9. On average, a grip is approximately 10.5 inches (26.7 cm) long. In the first step of the process a 10 inch (25.4 cm) strip of tape that is 2 inches (5.08 cm) wide is cut off the roll. The golf club 9 is horizontally secured in a vise 18 along the body 19 of the shaft 10. The tape (including liner) is aligned lengthwise along the shaft, such that the tape extends colinearly from the terminus 16 down the shaft 10. The tape is adhered to, using the shaft adhesive 4, and wrapped around the helve 17 portion of the shaft 10; and the release liner 15 is pulled off, exposing the grip adhesive 3. Next, the air hole 20 of the grip is covered using one's finger and the grip 11 is filled with water. The water is poured out of the grip inlet 21 over the length of the grip tape, wherein the water activates the grip adhesive 3. The wetted grip tape is shown in FIG. 4. The attenuated grip shank 22 proximal to the grip inlet 21 is pinched between the thumb and the forefinger, which causes the grip inlet 21 to flare out. The grip 11 is shoved down over the shaft until the terminus abuts against the air hole end of the grip. FIG. 5 shows the grip as it slides down the shaft. A thin film of water 12, into which has leached a small quantity of the grip adhesive containing Polyox WSR-301 is coated onto the surface of the tape 1. Once the grip is on the helve 17 portion of the shaft, the grip is adjusted until the tread is straight. FIG. 6 illustrates the relative position of the shaft, tape and grip through a longitudinal cross-sectional view of the terminus 16 of a golf club shaft. The tape 1 is folded over the terminus down into the hollow portion of the shaft 12. This fold neatens the application, but more importantly, prevent the grip from hanging up on the terminus as it is slide onto the shaft. The gripped club is removed from the vise and allowed to dry. A minimum drying time of 24 hours in a dry air environment is recommended prior to use.

We claim:

1. A pressure sensitive adhesive tape comprising:
   a carrier, wherein said carrier is an elongate ribbon supporting web having a first side and an opposing second side;
   a nominally tacky pressure sensitive adhesive having good shear and being relatively non-hygroscopic, which is coated on the first side of the carrier, said nominally tacky pressure sensitive adhesive being comprised of:
   an elastomer which swells in the presence of liquid water, wherein said elastomer is substantially polyoxyethylene diamine cured with diglycidyl ether bisphenol A,
   a lubricity component for enhancing slip of the nominally tacky pressure sensitive adhesive when the nominally tacky pressure sensitive adhesive is wetted with water, wherein said lubricity component is a high molecular weight water soluble polymer having a gram molecular weight of greater than or equal to 900,000, is chemically compatible with the elastomer, and is non-hygroscopic, and
   a biocidic and antioxidantic means, wherein said nominally tacky pressure sensitive adhesive is rendered temporarily slippery when wetted with water and returns to its nominally tacky state upon dissipation of the water;
   a pressure sensitive adhesive coated on the second side of the carrier, wherein said pressure sensitive adhesive coated on the second side has good shear and is relatively non-hygroscopic.

2. The pressure sensitive adhesive tape as claimed in claim 1, wherein said lubricity component is a polyoxyethylene resin having a gram molecular weight of greater than or equal to 0.9 million.

3. The pressure sensitive adhesive tape as claimed in claim 2, wherein said polyoxyethylene resin has a gram molecular weight of approximately 4 million.

4. The pressure sensitive adhesive tape as claimed in claim 1, wherein said elastomer is cross-linked with multifunctional acids.

5. The pressure sensitive adhesive tape as claimed in claim 1, wherein said pressure sensitive adhesive on the second side of the carrier is a rubber based adhesive, wherein the rubber is a blend of natural rubber and a styrenic block copolymer rubber.

6. The pressure sensitive adhesive tape as claimed in claim 1, wherein said tape is wound in roll form, and the nominally tacky pressure sensitive adhesive on the first side of the carrier is separated from the pressure sensitive adhesive on the second side of the carrier by a double sided silicone release liner.

7. A process for using the pressure sensitive adhesive tape as claimed in claim 6 to affix a grip to a shaft, wherein said process steps are:
   cutting, from the roll, a strip of said tape that is approximately the length of the grip;
   aligning the strip lengthwise along the shaft, such that the strip extends colinearly from an end of the shaft down the shaft;
   adhering the pressure sensitive adhesive coated on the second side of the carrier to the shaft, and wrapping the strip around the shaft;
   removing the double coated silicone release liner, therein exposing the nominally tacky pressure sensitive adhesive;
   filling the grip with water;
   pouring the water out of the grip over the length of the tape;
   shoving the grip down over the shaft as far as the grip will slide;
   adjusting the grip until it is straight.

* * * * *